May 18, 1926.
W. R. D. McQUARRIE
DISPENSING DEVICE
Filed Nov. 10, 1921
1,584,878
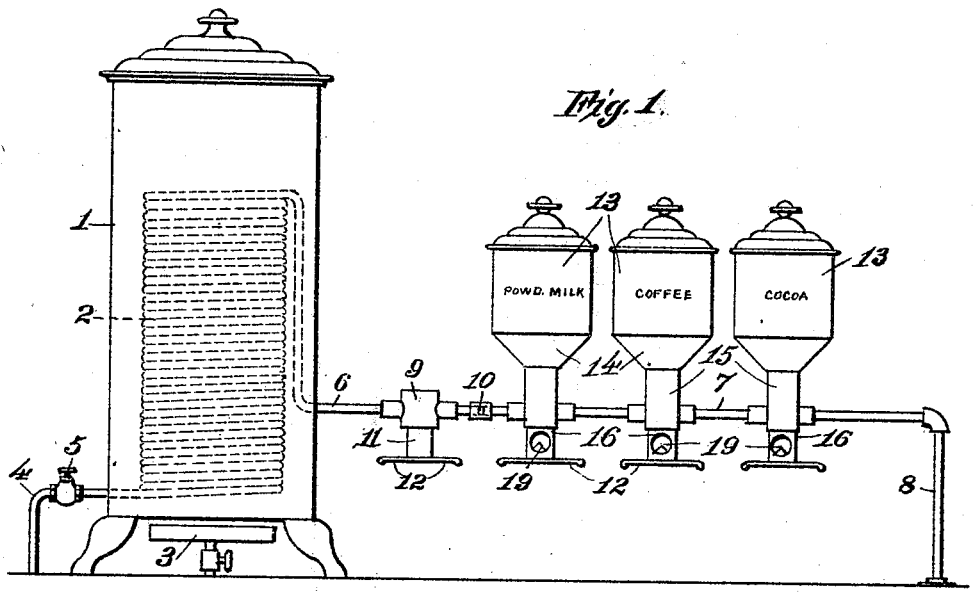
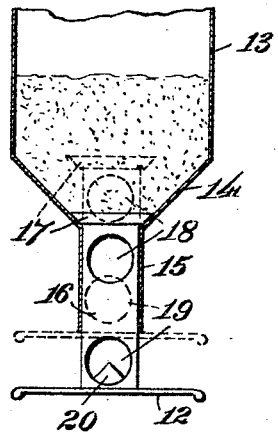
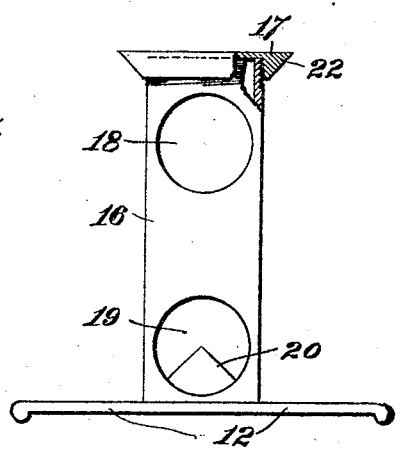
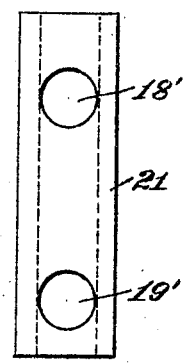
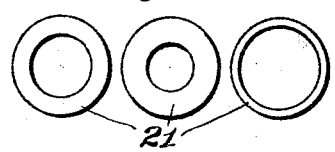
Inventor
William R. D. McQuarrie
By Joshua R. H. Potts
Attorney Patented May 18, 1926.

1,584,878

UNITED STATES PATENT OFFICE.

WILLIAM R. D. McQUARRIE, OF BUFFALO, NEW YORK.

DISPENSING DEVICE.

Application filed November 10, 1921. Serial No. 514,302.

My invention relates to devices for preparing hot drinks, such as tea, coffee, cocoa and the like, and particularly to such devices as are adapted for use in lunch rooms and other public eating places. More specifically my present invention relates to an improved valve for dispensing materials for said drinks.

The ordinary coffee urns as used in lunch rooms are objectionable for numerous reasons. In the first place, coffee prepared in the usual urns remains heated for a considerable length of time; and it is well known that this causes the coffee to become bitter and unpalatable. Furthermore, it is impossible to prepare just enough coffee to serve the patrons, and consequently at the end of the day a considerable amount of coffee is left in the urn, which must be thrown away, thereby entailing a loss. Also, it is more or less difficult to keep these urns in a clean and sanitary condition.

The object of my invention is to provide a device whereby fresh hot coffee and other drinks may be readily and quickly prepared as needed, to the end that the patrons may be furnished with freshly prepared palatable beverages. A further object of my invention is to provide a device as mentioned which shall avoid the loss and waste due to a surplus of coffee remaining on hand at the close of a day's business. A further object of my invention is to provide a device as mentioned which shall remain clean and sanitary without the requirements of special attention. Other objects will appear hereinafter.

My invention further consists in an improved discharge device for the several containers and also in means for adjusting the same to a desired quantity of the material. My invention further consists in various details of construction and arrangements of parts all as will be fully described hereinafter and particularly pointed out in the claim.

My invention will be more readily understood by reference to the accompanying drawings forming a part of this specification and in which—

Fig. 1 is a side elevation of a device embodying my invention,

Fig. 2 is a detailed sectional view of the lower portion of one of the containers illustrating the same equipped with my improved dispensing device, Fig. 3 is a detail of the dispensing valve, Fig. 4 is a side elevation of an insert for the valve for determining or regulating the quantity of the material to be discharged, and Fig. 5 is a top plan view of several of said inserts.

Referring now to the drawings, the water heater comprises an outer shell or drum 1, a coil 2 and a heating element, such as a burner 3. 4 indicates the inlet pipe provided with a valve 5, and 6 a discharge pipe. The discharge pipe is preferably extended as at 7 for a sufficient distance to support the several containers, as will be explained hereinafter, and terminates in a downwardly extending portion 8 for supporting the outer end thereof. The discharge pipe 6 adjacent the drum 1 is provided with a discharge valve 9, and adjacent said valve, I prefer to provide a plug 10 to prevent the water from entering the extension 7. The valve 9 includes a vertically movable spout 11, which, when raised, permits a discharge of hot water through the lower end thereof. The lower end of said spout is provided with laterally extending arms 12 to be engaged by the rim of the cup placed under the same, so that by placing a cup thereunder and raising the same, the spout 11 is raised and hot water is discharged into the cup.

Supported on the extension 7 are a plurality of similar containers 13. In the drawings, I have illustrated three of these containers, one for powdered milk, one for powdered coffee extract and one for cocoa; but it is obvious that others may be provided for holding other materials used in the preparation of various beverages. Each container 13 is provided with a hopper bottom 14 terminating in a tubular spout 15. Vertically slidable within the spout 15 is a tubular valve member 16, closed at its upper end by a cap 17. The valve member 16 is provided adjacent its upper end with an inlet port 18 and adjacent the lower end with a discharge port 19. The lower end of the valve member is closed, as by an inclined bottom 20, and is equipped with a cup engaging device 12 such as described in conjunction with the water discharge valve 9. The cap 17 constitutes a stop to limit the downward movement of the valve member, and the member 12 a stop to limit the upward movement thereof; and said valve member and spout 15 are so proportioned that when the valve is elevated the port 19 will be closed and the port 18 will be in communication with the container 13, and when in lower position the port 18 will be closed and the port 19 opened to discharge the material into a cup held beneath the same.

It is obvious, therefore, that to prepare a fresh cup of coffee, it is but necessary to place a cup beneath the coffee container and press upwardly on the part 12 and then lower the same to receive a measured quantity of powdered coffee extract. The cup is then placed beneath the powdered milk, if milk is desired, and the process repeated to receive a measured quantity of powdered milk, and then the cup is placed under valve 9 to fill the cup with hot water.

The object of my invention is to provide means whereby the discharge valves for the containers may be adjusted to discharge any desired quantity of material, according to its nature, so that the discharge valves for the various containers may all be manufactured of the same size thereby materially reducing the cost and make the device practical for use in various places and with cups or mugs of various sizes. To this end, I provide tubular inserts for the valves 16, said inserts fitting snugly within said valve but provided with bores of different diameter as illustrated in Figs. 4 and 5.

21 indicates the insert which may be of any desired material, but I have found fibre to be suitable for this purpose. These inserts are provided with ports 18' and 19' adapted to register with the ports 18 and 19.

In order to permit insertion of the member 21, the cap 17 is removably secured to the upper end of the valve 16, being preferably threaded thereon as shown. This cap 17 is preferably formed with an extended edge or flange 22 which agitates the material in the container when the valve is raised, and which constitutes a stop to limit the downward movement of the valve, as before mentioned. It is obvious that with these interchangeable inserts, the device may be adjusted to discharge the desired measured quantity of material.

It is obvious that with the device as above described, hot beverages may be quickly prepared for patrons and that there is no waste due to the surplus of beverage being left on hand at the close of the day's business. Also, the device maintains itself in a clean and sanitary condition as the hot water flowing through the coil and discharge valve maintains the same in such conditions. Also, by the use of the several inserts, the discharge valves for the several containers may be adjusted or regulated to discharge the prepared amount of material according to its kind and the size of the cup in use.

I claim:—

In a device of the class described, a container provided with a discharge spout, a tubular discharge valve adapted to reciprocate vertically therein, said valve being provided with an inlet port and an outlet port and a cup engaging member on the lower end of said valve, a removable cap forming the upper end of said valve and interchangeable tubular inserts having bores of different diameters adapted to be arranged therein, as and for the purpose specified.

In testimony whereof I have signed my name to this specification.

WILLIAM R. D. McQUARRIE.